3,557,223
HYDROGENATION OF ARALKYL KETONES
Paul N. Rylander, Newark, and Lillian G. Hasbrouck, Boonton, N.J., assignors to Engelhard Minerals & Chemicals Corporation, Newark, N.J., a corporation of Delaware
Filed Mar. 14, 1969, Ser. No. 807,307
Int. Cl. C07c 29/00
U.S. Cl. 260—618   3 Claims

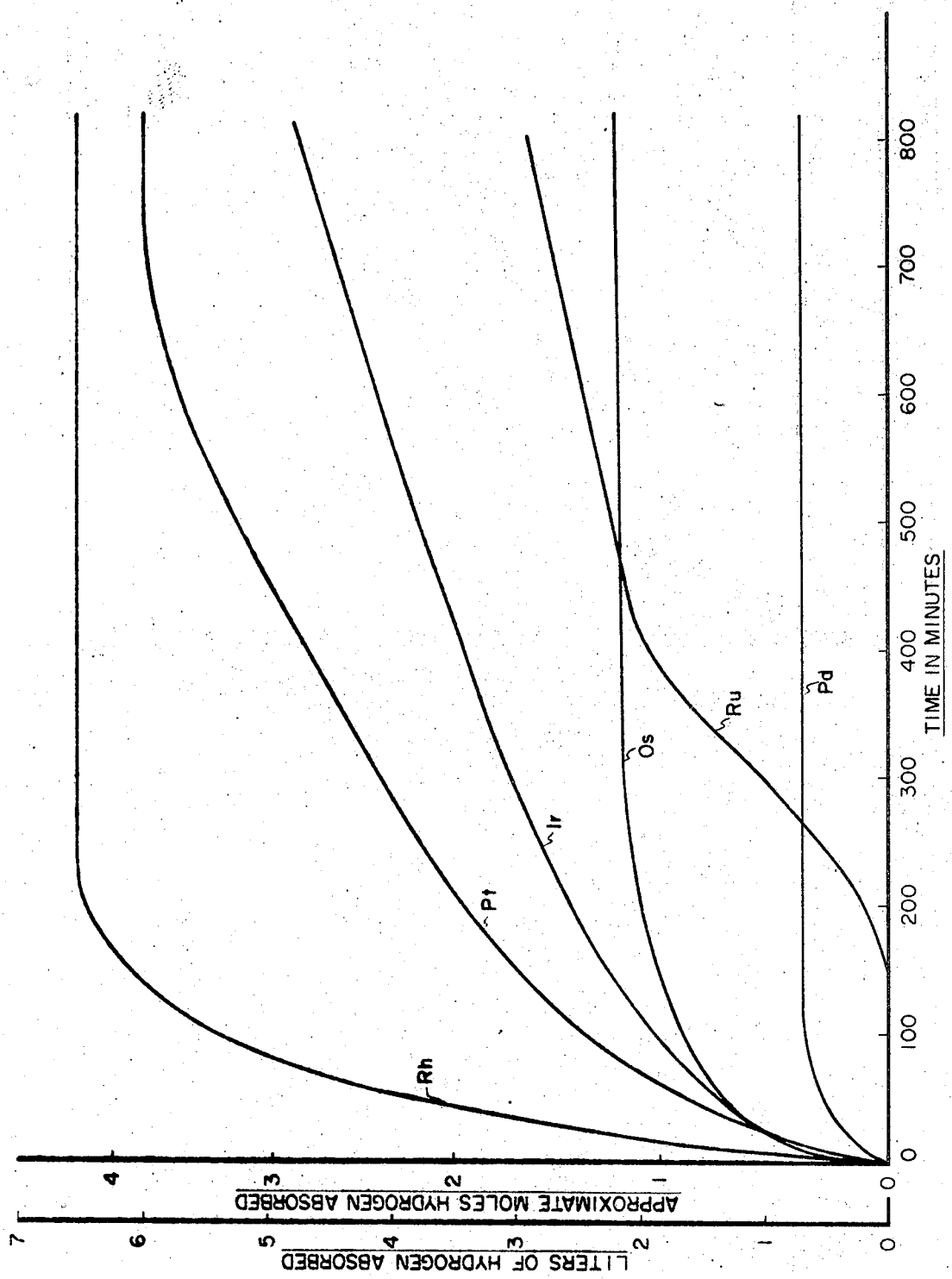

ABSTRACT OF THE DISCLOSURE

Catalytic reduction of aralkyl ketones to aralkyl alcohols with minimum hydrogenolysis and minimum ring reduction is effected by hydrogenation of aralkyl ketones in the presence of an osmium catalyst.

BACKGROUND OF THE INVENTION

In the reduction of aralkyl ketones, i.e. aromatics having a ketonic function which is not adjacent to the ring, both the aromatic and ketonic function can be reduced easily over an appropriate platinum metal catalyst. The selective reduction of such compounds is a more difficult problem since the reduction of the ketone and the ring and hydrogenolysis of the oxygen function will often occur simultaneously. For example, in the hydrogenation of phenylacetone, major products of the hydrogenation are phenylisopropanol, cyclohexylacetone, and cyclohexylisopropanol; phenylpropane and cyclohexylpropane can also be found in lesser amounts.

It is the object of the present invention to hydrogenate aralkyl ketones to produce the corresponding alcohols with a minimum of ring reduction and hydrogenolysis. According to prior work on the selective reduction of aromatic ketones, i.e. aromatics having the ketonic function adjacent to the ring, to the aromatic alcohols, palladium is the preferred platinum metal catalyst. In the reduction of acetophenone, for example, it was found that using palladium as the catalyst the aromatic alcohol is an intermediate product which can be obtained in good yield if the reduction, effected under mild conditions, is stopped after theoretical absorption of hydrogen. It was therefore expected that palladium would also be the preferred platinum group metal for the present reaction. However, it was found that reduction of aralkyl ketones over palladium under mild conditions is too sluggish and some ring reduction occurs.

It has now been found that in the presence of an osmium catalyst aralkyl ketones are selectively hydrogenated to the corresponding alcohols with minimum ring reduction and hydrogenolysis of the oxygen function. It has also been found that in the presence of an osmium catalyst the reduction proceeds at a relatively rapid rate and virtually stops after the ketonic function has been reduced.

INVENTION

In accordance with the present invention, aralkyl ketones are catalytically hydrogenated to the corresponding aromatic alcohols by hydrogenation in the presence of an osmium catalyst.

The osmium catalyst may be in the form of a finely divided metal or may be supported on a carrier. Preferably supported catalysts are used. Suitable carriers are carbon, alumina, barium sulfate, barium carbonate, calcium carbonate, calcium sulfate, and kieselguhr, preferable supports are carbon and alumina. Osmium catalysts and methods of preparation are well known. The supported catalyst is prepared in any suitable manner, e.g. by treating a carrier with a solution of a suitable osmium compound and then reducing such compound to osmium metal. Conventional supported osmium catalysts contain about .01 to 20% by weight osmium; those containing about 1 to 10% osmium are especially suitable in the practice of the present invention. It has been found convenient for exemplary purposes to employ a catalyst containing 5% by weight osmium metal. Generally, in the process of this invention the catalyst is employed in the amount of from about 1 to about 20% by weight, based on the weight of the aralkyl being treated.

The reaction temperature for hydrogenation is in the range of about 25 to 250° C., preferably about 50 to 150° C. The pressure is in the range of about 15 p.s.i.g. to 15,000 p.s.i.g., preferably about 500 to 2500 p.s.i.g. Since the undesired hydrogenolysis reaction usually occurs more readily at high temperatures, it is preferred to employ the mildest effective conditions within the range taught above.

The process is operated batchwise or continuously using conventional equipment. Typically the reduction is conducted in a liquid phase solution of the substrate in a suitable solvent. The solvents are inert organic compounds usually employed in hydrogenation reactions, e.g. methanol, ethanol, isopropanol, t-butanol, ethylacetate, dimethylformamide, cyclohexane, and acetic acid. Preferably lower alcohols are employed as the solvent. Typically the process is carried out by charging the reaction vessel with the substrate, solvent and catalyst and then passing hydrogen through the system or agitating the charge with hydrogen under pressure. The reaction virtually stops when the ketonic function has been reduced. The product may be separated or recovered by known methods such as fractional distillation, preparative chromatography and recrystallization.

Any aralkyl ketone may be hydrogenated according to the process of this invention. In general the ketones can be represented by the formula:

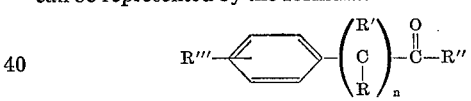

where

R''' represents hydrogen, lower alkyl, aryl, alkoxy, benzyl,
R and R' represent hydrogen, lower alkyl, aryl
R'' represents lower alkyl, and $n$ is from 1 to 20.

Generally, lower alkyls refer to alkyls having about 1 to 6 carbons.

Typical feed stocks include phenylacetone, p-methylphenylacetone, m-phenylphenylacetone, o-benzylphenylacetone, benzylacetone, p-ethylbenzylacetone, asym-diphenylacetone, sym-dibenzylacetone, 5-phenylpentanone-2, 6-phenylhexanone-3.

The corresponding aralkyl alcohols are useful as fragrances in perfumery, as chemical intermediates and as reaction solvents.

The following examples are presented to further illustrate the invention and should not be construed as limitations thereof. In the examples phenylacetone is used as a representative substrate and, for convenience, all the catalysts contained 5% catalytic metal by weight, supported on carbon.

EXAMPLE 1

A series of experiments were conducted at room temperature and a hydrogen pressure of one atmosphere, in a vigorously shaken one-liter flask attached to a water buret. The 1 liter flask was charged with 10.0 ml. of phenylacetone, 100 ml. of t-butanol and 6.4 g. of catalyst, and the air swept out with $H_2$ prior to shaking. In each experiment the shaking was stopped from time to time and samples were withdrawn and analyzed on a 6' x 1/8" FFAP-25% on Chromosorb W column programmed at 25° C. per minute between 120° and 200° C.

Representative results for maximum yields of phenylisopropanol are given in the table below.

TABLE

| Experiment | Catalyst | Products | | | |
|---|---|---|---|---|---|
| | | Phenylisopropanol (percent) | Cyclohexylacetone (percent) | Cyclohexylpropane (percent) | Other |
| 1 | Pd/C | 0 | 0 | 0 | No measurable reaction. |
| 2 | Pd/C [1] | 74.9 | 2.2 | 0 | 22.8% unreacted substrate. |
| 3 | Pt/C | 87.5 | 4.5 | 0 | N.D. |
| 4 | Rh/C | 50 | 23 | 18 | N.D. |
| 5 | Ru/C | 48.5 | 4.5 | 1.5 | N.D. |
| 6 | Os/C | 97 | 0 | 0 | 3% cyclohexylpropanol. |

[1] Experiment conducted at 50 p.s.i.g. initial $H_2$ pressure.

NOTE.—N.D.=Not determined.

The results show that osmium was most effective in reducing the aralkyl ketone in that a maximum yield of the phenylisopropanol was produced and this was achieved with little ring reduction and no hydrogenolysis. Experiment 1 shows that the palladium on carbon was completely ineffective in reducing phenylacetone at atmospheric pressure. Even at the elevated pressure, 50 p.s.i.g., of Experiment 2, the hydrogenation over palladium was sluggish, requiring 64 hours to reduce about 73% of the substrate. In Experiment 6, using osmium as the catalyst, the reduction of the carbonyl was virtually complete in 300 minutes.

EXAMPLE 2

A series of experiments were conducted with different platinum group metal catalysts by the procedure of Example 1 and the amount of hydrogen absorbed at 5–10 minute intervals was recorded. The results are shown in the accompanying figure, in which the liters of hydrogen absorbed are plotted against the time in minutes. The figure also shows approximately the moles of hydrogen relative to the liters of hydrogen absorbed. Each curve in the figure represents an experiment with a different platinum group metal (used as 5% metal supported on carbon) as the catalyst, as identified by Rh, Pt, Ir, Ru, Os, and Pd, respectively.

The curves together with the analysis of Example 1 show the superiority of Os for the selective reduction of the ketone. The graph shows, for example, that the palladium catalyst was deactivated in this system and the rate quickly fell to a very low value. Reductions over osmium, iridium, platinum, and ruthenium all show a sharp decline in rate after absorption of one mole of hydrogen, corresponding to reduction of the ketone group. However, in the reduction with osmium the curve virtually levels off on the absorption of 1 mole of $H_2$. As shown in Example 1, this is with all the ketonic function reduced and very little ring reduction or hydrogenolysis. With Rh, Ru, and Pt, concomitantly with the reduction of the ketone, ring reduction and hydrogenolysis occurred.

What is claimed is:
1. A process for hydrogenating aralkyl ketones of the formula

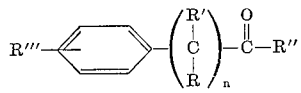

where
R''' represents hydrogen, lower alkyl, aryl, alkoxy, benzyl,
R or R' represents hydrogen, lower alkyl, aryl,
R'' represents lower alkyl, and $n$ is from 1 to 20,
to the corresponding aralkyl alcohols with minimum ring reduction and minimum hydrogenolysis, comprising reacting said aralkyl ketones with hydrogen in the presence of an osmium catalyst at a temperature in the range of about 25 to 250° C. and a pressure in the range of about 15 to 15,000 p.s.i.g.
2. A process of claim 1 wherein the osmium catalyst is carried on a support and the support is carbon or alumina.
3. A process of claim 1 wherein the aralkyl ketone is phenylacetone.

References Cited

UNITED STATES PATENTS 2,091,800  8/1937  Adking et al. _____ 260—618
3,260,759  7/1966  Skinner _____ 260—618

FOREIGN PATENTS 908,639  10/1962  Great Britain _____ 260—618

BERNARD HELFIN, Primary Examiner

U.C. Cl. X.R.

260—613